United States Patent [19]

Lepson

[11] Patent Number: 4,650,441
[45] Date of Patent: Mar. 17, 1987

[54] FLEXIBLE GEAR COUPLING INSPECTION PORT

[75] Inventor: Robert E. Lepson, Arbutus, Md.

[73] Assignee: Bethlehem Steel Corporation, Bethlehem, Pa.

[21] Appl. No.: 845,729

[22] Filed: Mar. 28, 1986

[51] Int. Cl.⁴ ............................................. F16D 3/18
[52] U.S. Cl. .................................... 464/16; 464/154; 464/185
[58] Field of Search ............... 403/6, 10; 464/7, 16, 464/154, 158, 159, 170, 185

[56] References Cited

U.S. PATENT DOCUMENTS

| 2,181,537 | 11/1939 | Schmitter | 464/170 |
| 2,510,414 | 6/1950 | Philbrick | 464/16 X |
| 3,651,662 | 3/1972 | Hoffman | 464/16 |
| 3,868,833 | 3/1975 | Noe et al. | 464/170 X |
| 4,050,544 | 9/1977 | Kalyan et al. | 464/7 X |
| 4,534,746 | 8/1985 | Hausinger | 464/170 |

FOREIGN PATENT DOCUMENTS 2258189 6/1974 Fed. Rep. of Germany ...... 464/154

Primary Examiner—Daniel P. Stodola
Attorney, Agent, or Firm—John I. Iverson

[57] ABSTRACT

An inspection port to permit inspection of internal gears in a flexible coupling of the type used to connect rotating shafts in machinery.

4 Claims, 3 Drawing Figures

FLEXIBLE GEAR COUPLING INSPECTION PORT

BACKGROUND OF THE INVENTION

This invention relates to flexible gear couplings used to connect rotating shafts in machinery. It relates particularly to a means of inspecting the gears used in such couplings.

Flexible couplings are commonly used for connecting rotary shafts in machinery such as the shafts connecting an electric motor to a pump. Such couplings are very useful in prolonging the life of the machinery since the repeated flexing of rigidly coupled rotary shafts, regardless of how slightly they are misaligned, can produce severe stresses in the shafts, the bearings and the machinery. Also excessive stresses can be incurred when the normal axial movement of rigidly coupled rotary shafts is constrained. A flexible coupling on the shafts permits such excessive stresses by compensating for any misalignment of the shafts or axial shaft movement, while at the same time transmitting the torque from one shaft to the other.

Gear type flexible couplings are manufactured by many manufacturers of mechanical power transmission equipment and are widely used in industry. The gear-type coupling consists of two similar hubs with external gear teeth and a floating sleeve assembly with internal gear teeth. The hubs are fitted to the ends of the driving and driven shafts, and as the driving shaft rotates, the driving hub gear teeth engage the internal gear teeth of the floating sleeve assembly so that the entire coupling rotates as a unit.

Flexible gear couplings, like any other piece of rotating machinery, are subject to excessive wear if not properly lubricated and maintained. In addition, flexible gear couplings are frequently subjected to starting and stopping impact loads that can damage the gears, if excessive. As a result flexible gear couplings need to be regularly inspected and repaired or replaced if necessary. Regular inspections are often required by OSHA regulations. The sealed sleeve over the hubs prevents a visual inspection of the conditions of the gears on the hubs and the gears in the sleeve. An inspection requires the removal of the motor or prime mover and a complete disassembly of the flexible gear coupling, which is time-consuming and expensive.

SUMMARY OF THE INVENTION

It is an object of this invention to provide a means for quickly and easily inspecting the condition of the gears in a flexible gear coupling.

It is a further object of this invention to provide a means for inspecting the condition of the gears in a flexible gear coupling that can be easily applied to all types of gear couplings and to couplings now in service.

It is a further object of this invention to provide a flexible gear coupling that will provide longer trouble-free service.

It has been discovered that the foregoing objectives can be attained by a flexible gear coupling having an inspection aperture in the sleeve assembly which extends through the sleeve assembly and through the central section of at least one tooth of the internal gear teeth of the sleeve assembly of the coupling.

DESCRIPTION OF THE PREFERRED EMBODIMENT OF THE INVENTION

Figure 1:
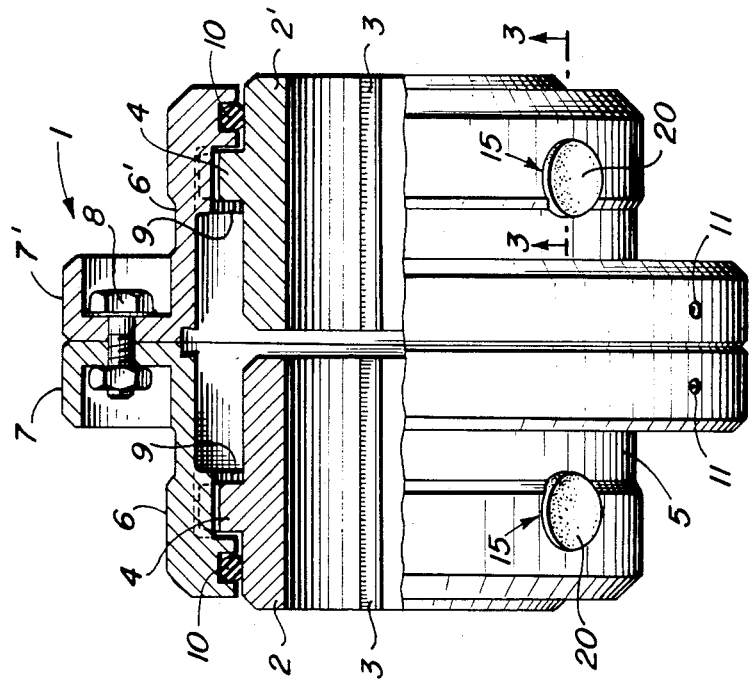
FIG. 1 is an isometric view, partially in section, of a flexible gear coupling of this invention.

FIG. 1 illustrates a flexible gear coupling of the type for which this invention is useful.

As shown in FIG. 1, flexible gear coupling 1 comprises a pair of hubs 2 and 2' and a pair of sleeve members 6 and 6' which are bolted together to form a sleeve assembly 5. The hubs 2 and 2' each have a keyway 3 to secure a cylindrical shaft (not shown). A ring of gear teeth 4 is formed on the external surface of each of hubs 2 and 2'. The hubs 2 and 2' are usually of the same diameter.

Surrounding the hubs 2 and 2' is a sleeve assembly 5 consisting of mating flanged sleeve members 6 and 6' which are connected together at their flanges 7 and 7' by bolts 8. The sleeve members 6 and 6' are each provided with an internal ring of gear teeth 9 positioned to engage the external gear teeth 4 of hubs 2 and 2' when the coupling 1 is assembled.

As the driving shaft (not shown) rotates hub 2, the external gear teeth 4 of hub 2 engage the internal gear teeth 9 of the sleeve member 6 causing the entire sleeve assembly 5 to rotate and in turn rotate hub 2' and the driven shaft (not shown) connected thereto.

The sleeve members 6 and 6' are provided at their outer ends with O-rings 10 or similar seals which engage the hubs 2 and 2' to prevent dirt and water from entering the coupling 1 and to retain a lubricant within the coupling 1. Some couplings have a mechanical configuration designed in the sleeve end that maintains the required lubricant level without the need for a resilient seal. Most couplings of this type require an internal lubricant which injected into the coupling 1 through a lubrication passage 11 formed in the flanges 7 and 7' of the sleeve members 6 and 6'.

In accordance with this invention, each sleeve member 6 and 6' is provided with an inspection port or aperture 15 extending through the sleeve 6 and 6' and through the central section of at least one tooth 16 of the internal gear teeth 9 of the sleeve members 6 and 6'. Since the hubs and sleeves never disengage, the wear seen on one tooth is indicative of the wear on all the teeth.

Figure 2:
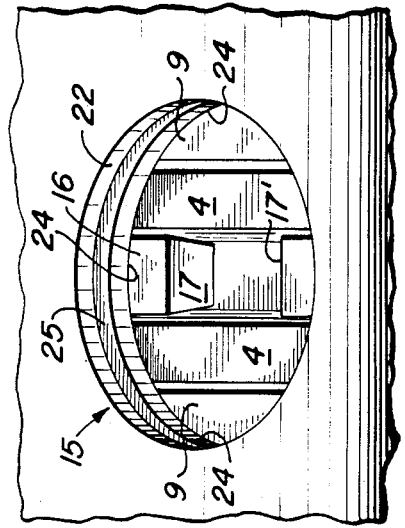
FIG. 2 is an enlarged view of the gears viewed through the inspection port of the flexible gear coupling of this invention.

As best shown in FIG. 2, which is an enlarged view of what one would see in looking through the inspection aperture 15 of this invention, the central section of at least one tooth 16 is removed leaving the side sections 17 and 17' of that tooth in place. The removal of the central section of tooth 16 exposes the profile of the side sections 17 and 17' and the tooth thickness and also the face flanks of teeth 4 on the hubs 2 and 2' to a visual inspection through the inspection aperture 15. Preferably, the aperture 15 is in a circular hole whose center is aligned with the midpoint of the width of the internal gear teeth 9 of the sleeve members 6 and 6'. The diameter of the aperture 15 should be greater than two times but less than three times the pitch of the external gear teeth 4 on the hubs 2 and 2' to permit an inspection of two hub teeth thickness conditions at a time. The bottom of the aperture 15 is formed by the tops of gear teeth 9 adjacent to gear tooth 16.

Figure 3:
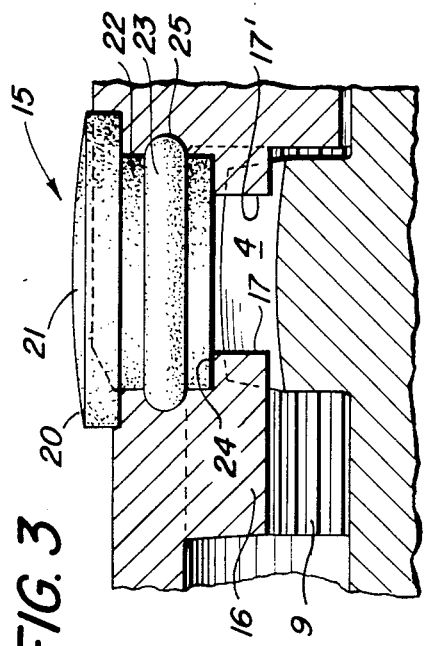
FIG. 3 is the closure member used to seal the inspection port of the flexible gear coupling of this invention.

FIG. 3 is a sectional view of the inspection aperture showing the means to seal said aperture 15 between inspections. The seal is a resilient elastomer plug 20 having a head 21 and shank 22 and a circumferential shoulder 23 between the head 21 and the leading end 24 of the shank. When inserted in aperture 15, the shoulder 23 of plug 20 fits into a circumferential groove 25 in the sleeve assembly around the aperture 15 to retain the plug 20 in place.

The exact dimensions of the aperture 15 and plug 20 will vary according to the size of the coupling 1. The inspection aperture 15 can be easily machined in the sleeve members 6 and 6' of all flexible gear couplings on the market although the exact location and size may vary according to the specific brand of coupling used.

While the present invention has been described and illustrated with our preferred embodiment, it will be appreciated by those skilled in this art, after understanding this invention, that various changes and modifications may be made without departing from the spirit and scope of this invention. It is therefore intended that all such changes and modifications will be included in the following claims.

I claim:

1. In a flexible gear coupling of the type used to connect rotating shafts and having a pair of hubs having external gear teeth enclosed in a sleeve assembly including a sleeve portion with internal gear teeth extending from the inner surface thereof, said internal gear teeth engaging said external gear teeth of said hubs, the improvement comprising at least one inspection aperture in said sleeve assembly, said at least one aperture having a first aperture portion extending through said sleeve portion and a second aperture portion extending through one tooth of said internal gear teeth intermediate its ends to expose the profile of said tooth, the centerline of said at least one aperture being aligned with the midpoint of the width of said tooth, said at least one aperture being a circular aperture through said sleeve portion whose diameter is greater than two times but less than three times the pitch of the external gear teeth of said hubs.

2. The flexible gear coupling of claim 1 wherein the cross-sectional size of said second aperture portion is less than the cross-sectional size of said first aperture portion.

3. The flexible gear coupling of claim 1 further including a circumferential groove formed in said sleeve portion around said at least one aperture and means for sealing said at least one aperture retained in said groove.

4. The flexible gear coupling of claim 3 in which the means for sealing said at least one aperture is a resilient plug.

* * * * *